United States Patent [19]
Saad

[11] 3,805,615
[45] Apr. 23, 1974

[54] TEMPERATURE MEASURING APPARATUS FOR USE IN AN OVEN

[75] Inventor: Theodore S. Saad, Westwood, Mass.

[73] Assignee: Sage Laboratories, Inc., Natick, Mass.

[22] Filed: Dec. 30, 1971

[21] Appl. No.: 214,095

[52] U.S. Cl. .............................. 73/340, 73/193 A
[51] Int. Cl. ....................................... G01k 3/08
[58] Field of Search.......... 73/340, 341, 342, 193 R, 73/193 A

[56] References Cited
UNITED STATES PATENTS
2,058,491  10/1936  Noble ................................. 73/340

Primary Examiner—Richard C. Queisser
Assistant Examiner—Denis E. Corr

[57] ABSTRACT

A temperature tray is used in an oven, preferably a microwave oven, to measure the temperature gradient over an area of the oven and the expected energy absorbed by a load when placed in the oven, and includes a plurality of separate compartments each filled with an identical amount of water and each having a relatively small thermometer disposed in the compartment and covered by the water. The oven is operated for a predetermined time period and as soon as the oven is opened each temperature reading is recorded as rapidly as possible. The recorded readings indicate the temperature gradient over an area of the oven, cold or hot spots in the oven, and can be used to calculate the energy absorbed by the water load.

14 Claims, 4 Drawing Figures

PATENTED APR 23 1974

TEMPERATURE MEASURING APPARATUS FOR USE IN AN OVEN

FIELD OF THE INVENTION

The present invention relates to an apparatus for use in an oven, preferably a microwave oven, to measure the temperature gradient within the useable portion of the oven. The oven is operated for a predetermined time period with the apparatus therein and after the termination of the predetermined time period a plurality of temperature readings associated with preselected areas of the apparatus are rapidly recorded.

BACKGROUND OF THE INVENTION

Concerning the microwave oven technology, there is a present need for more accurately determining the efficiency of operation of such ovens. For example, there is no effective way of determining whether there may be hot or cold spots in the oven. The present invention is directed to an apparatus for "characterizing the oven" by (1) recording the temperature gradient over an area of the oven, (2) determining therefrom the hot and cold spots within the oven, and (3) calculating therefrom the energy absorbed by the apparatus.

OBJECTS OF THE INVENTION

Accordingly, one important object of the present invention is to provide an apparatus for use in an oven, preferably a microwave oven, for measuring the temperature gradient over an area of the oven, determining the minimum and maximum temperatures of those measured, and calculating the energy absorbed by the apparatus.

Another object of the present invention is to provide an apparatus in accordance with the preceding object including a plurality of liquid filled compartments arranged in a group over an area of the oven, and a plurality of thermometers one being disposed in each compartment and being covered by the liquid. After a predetermined heating period the readings from the thermometers are successively and rapidly recorded.

A further object of the present invention is to provide an apparatus in accordance with the preceding objects, that is simple in construction, may be fabricated relatively inexpensively, may be readily manufactured in large quantities, and is useable even by an unskilled person.

SUMMARY OF THE INVENTION

To accomplish the foregoing and other objects of the present invention the apparatus is for use in an oven, preferably a microwave oven, for determining the temperature gradient over an area of the oven under normal operating conditions. The apparatus generally comprises a means for retaining a liquid which acts as a load for absorbing the oven heat, and a plurality of temperature recording means. The liquid that is used is preferably water and the means for retaining the liquid preferably includes means defining a plurality of compartments arranged in a group or an array extending over an area of the oven, and means for permitting the same amount of liquid to fill each compartment. The temperature recording means are disposed, one in each compartment, and are covered by the liquid. The initial temperature of the recording means is noted so that the temperature changes can be determined. In a preferred embodiment the temperature recording means each include a relatively small thermometer, and after energy has been applied to the oven for a predetermined time period the readings of each thermometer are successively recorded with the use of a tape recorder, for example.

In one embodiment of the present invention the apparatus includes a heating tray having a plurality of liquid retaining compartments arranged in a checkerboard fashion with interconnecting holes provided for equalizing the amount of liquid in each compartment. Preferably, a post or the like extends from the bottom of each compartment for holding the thermometer below the liquid level.

In accordance with the method of the present invention the plurality of recorded readings define the temperature gradient and are used to determine the minimum and maximum temperatures recorded and are also used to calculate the energy absorbed by the liquid load.

BRIEF DESCRIPTION OF THE DRAWINGS

Numerous other objects, features and advantages should now become apparent upon a reading of the following detailed description when taken in conjunction with the appended drawings in which.

DETAILED DESCRIPTION

Figure 1:
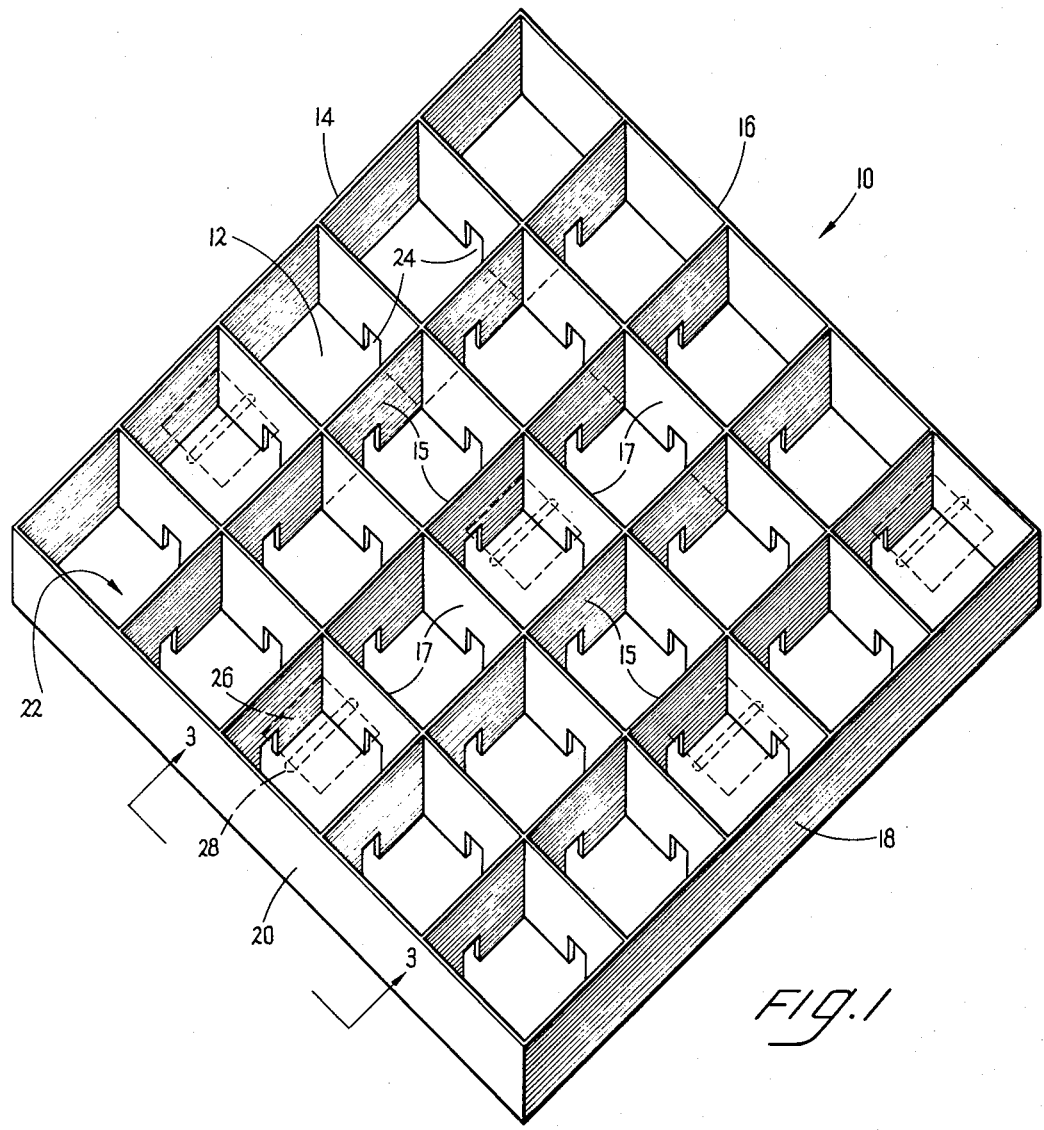
FIG. 1 is a perspective view of the temperature tray of the present invention showing only some of the thermometers.

Throughout the figures of the drawings, like reference numerals shall be used to designate like parts where appropriate.

Referring now to FIG. 1 there is shown a perspective view of a temperature tray 10 which is of generally square configuration and is approximately 2 inches deep. The tray 10 includes a bottom wall 12 and perimeter walls 14, 16, 18 and 20. There are four inner walls designated by the reference numeral 15 disposed parallel to and intermediate walls 14 and 18. Similarly, there are four inner walls designated by the reference numeral 17 disposed in parallel between walls 16 and 20. The inner walls 15 and 17 along with the perimeter walls define a plurality of separate compartments 22. In the embodiment shown in FIG. 1 there are 25 of these compartments arranged in a five-by-five array.

In each of the compartments 22 there is provided an opening 24 in both the inner walls 15 and 17. The opening 24 may be square, rectangular or circular and may or may not extend to the bottom wall 12. The purpose of the openings 24 between each of the adjacent compartment 22 is to assure that an equal amount of liquid exists in each of the compartments 22. The liquid may be poured into the tray 10 and the tray may then remain stationary until the liquid has sought an equal level in each compartment.

Figure 3:
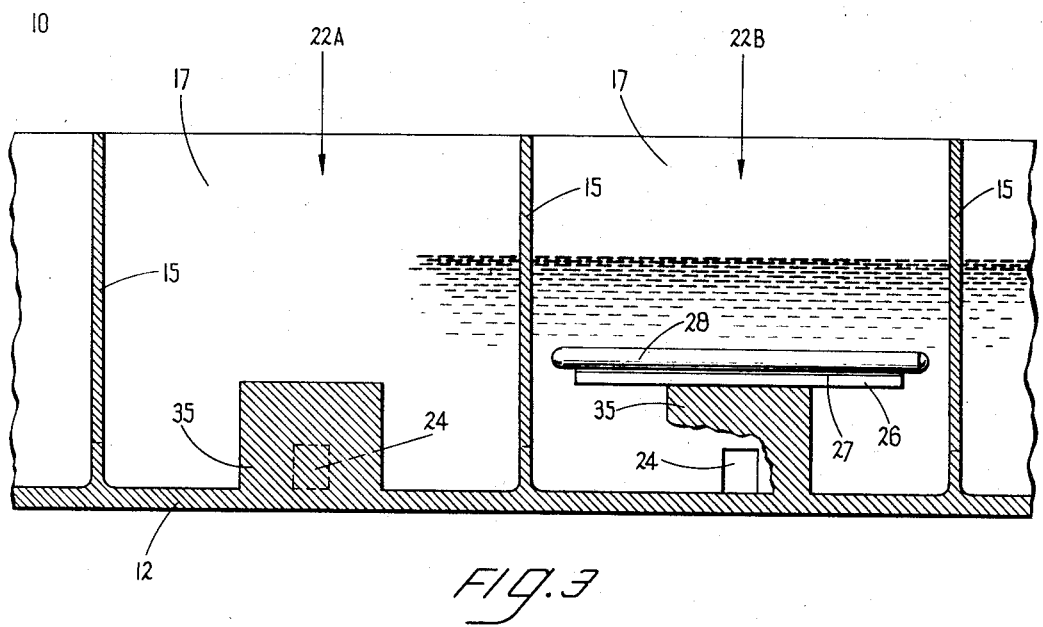
FIG. 3 is a cross sectional view taken along line 3—3 of FIG. 1 showing the interior of the compartment and a support means for the thermometer.
Figure 4:
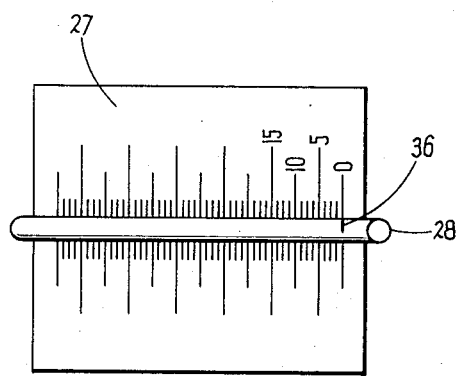
FIG. 4 is a plan view of one of the thermometers and associated support means of FIGS. 1 and 3.

FIG. 1 also shows a support means 26 one of which is disposed in each compartment 22, and a thermometer 28 which is affixed to the support means 26 of each compartment. FIGS. 3 and 4 show the support means and thermometer of FIG. 1 in more detail.

The temperature tray 10 may be fabricated of a plexiglass material or any other type of dielectric material such as teflon. The compartments 22 may be approximately 2½ inches square. The entire tray 10 including at least part of the support means 26 may be fabricated in a single unit by a known method such as injection molding. Alternatively, the tray 10 may be fabricated in separate pieces including the outer perimeter walls and bottom wall forming one piece and the inner walls 15 and 17 being interjoined in a known manner to form the remainder of the tray.

Figure 2:
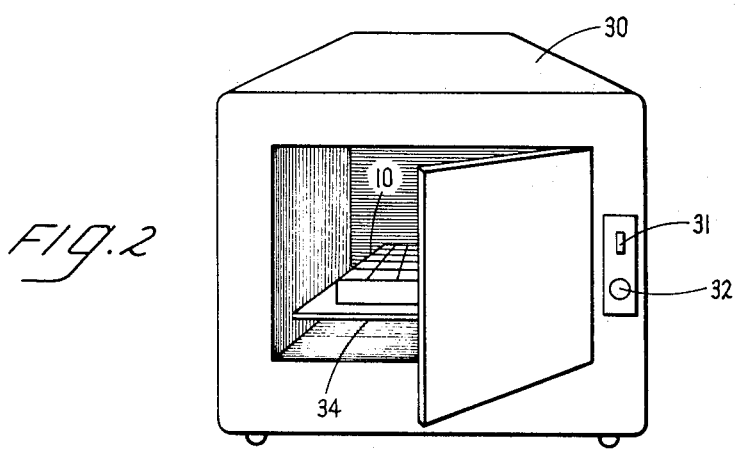
FIG. 2 shows a typical microwave oven within which the temperature tray of FIG. 1 is disposed.

Referring now to FIG. 2 there is shown a microwave oven 30 which may include an on-off switch 31 and a timer 32 for defining the time period that the oven is operative. The tray 10 in FIG. 2 is shown resting upon shelf 34. The method of the present invention shall be discussed hereinafter with reference to FIG. 2.

Referring now to FIG. 3 there is shown a cross-sectional view taken along line 3—3 of FIG. 1 showing two compartments of the tray 10 which are identified in FIG. 3 as compartments 22A and 22B defined between walls 15 and 17 and perimeter wall 20 which is cut away in FIG. 3.

Compartments 22A and 22B are shown as having an opening 24 defined in wall 17 and have a base support 35 extending from bottom wall 12. Base support 25 is preferably centrally located in compartment 22 and may either form a part of bottom wall 12 or may be secured to bottom wall 12 by suitable means. For example, the base support 35 may have a downwardly urged tab that fits within a recess in wall 12 and it may be glued in place therein. Base member 35, as viewed from the top, may have either a rectangular or a square shape. A support member 26 is secured to the top of base member 35. This support member 26 may be a pad of alumina ceramic which is applied by adhesive to base member 35. On top of the support member 26 there is affixed a film 27 which is preferably a mylar tape having a temperature scale photoprinted thereon by conventional means. The film 27 may be affixed to support member 26 by an adhesive. Similarly, the thermometer 28 may also be suitably applied to the film 27 by an adhesive.

The thermometer 28 has a mark designated by the reference numeral 36 which indicates a Fahrenheit temperature of 70° F. This mark is aligned with the zero point on the mylar film 27. When the tray is initially disposed in the oven, the initial temperature reading, which should be the same for all thermometers, is recorded by the operator. Temperature differences are recorded in one scheme and the power absorbed by the water load can be calculated therefrom.

In accordance with the method of the present invention the temperature tray 10 depicted in FIG. 1 is placed on the shelf 34 of the microwave oven 10 shown in FIG. 2 and the timer 32 is set to a predetermined time after the door of the oven is closed. In one particular test cycle the timer is set to 60 seconds and the operating frequency of the microwave oven is 2,450 megahertz. After the predetermined time period has elapsed the tray 10 is quickly removed and the operator of the test records the readings of each thermometer 28 in a particular predetermined plan. From the end of the predetermined oven cycle all of the readings can be taken in about a 10 second interval. Thus, the water load should not have sufficient time to change its temperature appreciably.

The readings that are taken correspond to compartments of tray 10 and the total readings represent the temperature gradient over a useable area of the oven. In this connection it is noted that the tray 10 is located in the same general location as would be a piece of food, for example, that was being cooked in the oven. Also, the recorded readings indicate any cold or hot spots that may be associated with the oven.

The energy absorbed by the water load may be calculated using the following known formula:

$$W \text{ (watts)} = 2.33 \, \Delta T \, V/t$$

where
$W$ = watts of energy absorbed by water load,
$\Delta T$ = average change in temperature of load in Fahrenheit degrees,
$V$ = total volume of water in temperature tray, and
$t$ = time in seconds that oven is operating, Assuming a volume $V$ of 500 cubic centimeters the wattage is:

$$W = 1,160 \, \Delta T/t$$

In one example, $t$ is 60 seconds. The average $\Delta T$ temperature change is arrived at by adding all the temperature readings together and dividing by the total number of readings taken. It is preferred that the time to be long enough to allow the $\Delta T$ change to be on the order of 15° to 30° F. For $\Delta T = 15°F$, the wattage absorbed when $t = 60$ seconds is $1,160(15)/60$ or $w = 290$ watts. If another liquid is used the specific heat is taken into account in the above formulas, and the constant 2.33 changes appropriately.

Having described an embodiment of the present invention it should now become apparent that other embodiments, modifications thereof and departures therefrom, can be constructed by one skilled in the art all of which are contemplated as falling within the spirit and scope of the present invention. The temperature tray, for example, can be of any configuration including a circular or rectangular shape. Also, the tray may be three dimensional in configuration including compartments oriented one above the other. Other temperature sensors can be employed other than the ones specifically disclosed herein. Also, automatic means can be devised for recording the readings from the sensors.

With the apparatus of the present invention it is possible to standardize the operation of particularly a microwave oven. At the present time there is no effective way of testing the operation of one brand of oven and comparing it with the operation of another brand of oven. In the present invention like apparatus can be used in different ovens to compare temperature gradients, minimum/maximum temperature spots and total energy absorbed.

What is claimed is:

1. Apparatus for use in an oven for determining the temperature gradient over an area of the oven under operating conditions of the oven comprising;
    means for retaining a liquid including means defining a plurality of compartments arranged in a group and means for permitting the same amount of liquid to fill each compartment,
    a plurality of thermometers, one being disposed in each compartment and being covered by the liquid, means in each compartment for supporting said thermometer including a platform and film means having indicia printed thereon said thermometer being positioned on and affixed to said film means, said indicia being arranged in a temperature scale.

2. The apparatus of claim 1 wherein said means for retaining a liquid includes a tray and said means defining a plurality of compartments includes a plurality of walls arranged to divide the tray into compartments.

3. The apparatus of claim 2 wherein said tray and said walls are arranged to define a plurality of equal sized compartments.

4. The apparatus of claim 3 wherein said compartments each have a square cross-section.

5. The apparatus of claim 2 wherein said means for permitting includes passages in said walls interconnecting adjacent compartments so that the liquid seeks a common level in each compartment.

6. The apparatus of claim 1 wherein said oven includes a microwave oven.

7. The apparatus of claim 1 wherein said supporting means includes a post extending from a bottom wall of each compartment for holding said platform.

8. A method for determining the temperature gradient over an area of an oven under operating conditions of the oven comprising the steps of;
providing a tray having a plurality of compartments arranged in a group,
filling each compartment with the same amount of a liquid,
introducing the tray into the oven,
operating the oven for a predetermined time period,
removing the tray from the oven,
and recording the temperature of the liquid in each compartment to determine the temperature gradient.

9. The method of claim 8 and further comprising calculating the energy absorbed by the liquid load from the recorded temperature readings.

10. Apparatus for use in a microwave oven for registering a plurality of temperature readings over an area of the oven during the operation of the oven over a predetermined time period comprising;
means defining a liquid retaining tray having at least one perimeter wall and a bottom wall,
a plurality of divider walls disposed within said tray and defining a plurality of compartments,
a liquid filling each compartment with the same amount of liquid filling each compartment,
each said divider wall having at least one passage therethrough so as to connect each compartment with an adjacent compartment,
support means extending from the bottom wall, one support means being associated with each compartment,
a plurality of thermometers, one being disposed in each compartment supported by said support means and covered by the liquid,
and means for recording the temperature of each thermometer after said predetermined time period.

11. Temperature gradient measuring apparatus comprising;
means for retaining a liquid including intersecting walls defining a plurality of compartments arranged in a group,
and a plurality of temperature indicating means, one being disposed in each comparment, to determine said temperature gradient,
at least one wall defining each compartment having a passage therein near a bottom end thereof so that the liquid has a common level in each comparment when said temperature gradient is a finite value.

12. The apparatus o claim 1 wherein all compartments are of the same size in at least two dimensions.

13. The apparatus of claim 11 comrising means for supporting said temperature indicating means including a support platform having temperature indicating indicia associated therewith.

14. Apparatus for use in an oven for determining the temperature gradient over an area of the oven under operating conditions of the oven comprising;
a tray including a plurality of intersecting walls defining a plurality of compartments each having the same amount of liquid disposd in each compartment,
a plurality of temperature indicating mean, one being disposed in each compartment,
and means supporting each temperature indicating means,
each said temperature indicatin means responsive primarily only to changes in temperature of the lquid in its compartment in which it is disposed.

* * * * *